(12) United States Patent
Yamaguchi (10) Patent No.: US 11,422,971 B2
(45) Date of Patent: Aug. 23, 2022

(54) DATA MIGRATION SYSTEM AND DATA MIGRATION METHOD

(71) Applicant: Hitachi Systems, Ltd., Tokyo (JP)

(72) Inventor: Hiroshi Yamaguchi, Tokyo (JP)

(73) Assignee: HITACHI SYSTEMS, LTD., Tokyo (JP)

( * ) Notice: Subject to any disclaimer, the term of this patent is extended or adjusted under 35 U.S.C. 154(b) by 508 days.

(21) Appl. No.: 16/096,308

(22) PCT Filed: Jun. 6, 2016

(86) PCT No.: PCT/JP2016/066740
§ 371 (c)(1),
(2) Date: Oct. 25, 2018

(87) PCT Pub. No.: WO2017/212521
PCT Pub. Date: Dec. 14, 2017

(65) Prior Publication Data
US 2019/0138496 A1    May 9, 2019

(51) Int. Cl.
*G06F 16/00* (2019.01)
*G06F 16/11* (2019.01)
(Continued)

(52) U.S. Cl.
CPC .......... *G06F 16/119* (2019.01); *G06F 3/0604* (2013.01); *G06F 3/067* (2013.01); *G06F 3/0647* (2013.01); *G06Q 50/10* (2013.01)

(58) Field of Classification Search
CPC .... G06F 16/119; G06F 3/0604; G06F 3/0647; G06F 3/067; G06Q 50/10
(Continued)

(56) References Cited

U.S. PATENT DOCUMENTS

| | | | |
|---|---|---|---|
| 7,895,104 B1* | 2/2011 | Lee | G06Q 40/00 705/35 |
| 8,606,671 B2* | 12/2013 | Lee | G06Q 10/0637 705/35 |
| 2013/0145027 A1* | 6/2013 | Parthasarathy | G06F 21/6218 709/225 |

(Continued)

FOREIGN PATENT DOCUMENTS

| | | |
|---|---|---|
| JP | 2008-287303 A | 11/2008 |
| JP | 2012-164090 A | 8/2012 |

(Continued)

OTHER PUBLICATIONS

Jiaqiang Liu et al., "SDN-based Live VM Migration Across Datacet-ers", SIGCOMM'14, Aug. 17-22, 2014, 2 pages.*

(Continued)

*Primary Examiner* — Monica M Pyo
(74) *Attorney, Agent, or Firm* — Mattingly & Malur, PC (57) ABSTRACT

In an SDN environment, data is migrated after checking whether the data conforms to a legal system of a migration destination. A control device changes a communication setting between first and second servers based on migration destination information and migration source information received from the first server and SDN setting data on a communication setting of the SDN stored in advance. The first server receives data on the legal system and determines whether the data conforms to the legal system to thereby determine whether the data can be migrated, or not. The control device executes a change in the communication setting when it is determined that the migration is enabled from the first server. The first server transmits data stored in a first storage unit to the second server according to the changed communication setting and the data is stored in a second storage unit.

8 Claims, 7 Drawing Sheets

(51) Int. Cl.
*G06Q 50/10* (2012.01)
*G06F 3/06* (2006.01)

(58) Field of Classification Search
USPC .......................................... 707/827
See application file for complete search history.

(56) References Cited

U.S. PATENT DOCUMENTS

| | | |
|---|---|---|
| 2014/0351323 A1 | 11/2014 | Sumida et al. |
| 2016/0381124 A1* | 12/2016 | Hwang ............... H04L 43/0817 709/226 |
| 2017/0187607 A1* | 6/2017 | Shaikh ................. H04L 41/042 |
| 2017/0187686 A1* | 6/2017 | Shaikh .................... H04L 63/10 |
| 2017/0300353 A1* | 10/2017 | Yu ........................... H04L 29/08 |

FOREIGN PATENT DOCUMENTS

| | | |
|---|---|---|
| JP | 2015-501043 A | 1/2015 |
| WO | 2013/065161 A1 | 5/2013 |

OTHER PUBLICATIONS

Isei Yamamoto, "Cloud Jidai ni Okeru Joho Security no Kadai to Taio", Knowledge Creation and Integration 2014 Nen The September issue, [online], Sep. 2014, Retrieval date Jul. 26, 2016, pp. 24 to 33. Internet <URL:https://WWW.nri.com/~/media/PDF/jp/opinion/teiki/chitekishisan/cs201409/cs20140904.pdf>.
International Search Report of PCT/JP2016/066740 dated Aug. 9, 2016.

* cited by examiner

| PRODUCT ID | PRODUCT NAME | MATERIAL |
|---|---|---|
| S0001 | A1 | B1, C1 |
| S0002 | A2 | B1 |
| ⋮ | ⋮ | ⋮ |

FIG. 5

| USER ID | USER NAME | PASSWORD | ADDRESS | WORKPLACE | |
|---|---|---|---|---|---|
| U0001 | a1 | b1 | c1 | d1 | |
| U0002 | a2 | b2 | c2 | d2 | |
| ⋮ | ⋮ | ⋮ | ⋮ | ⋮ | |

| VOLUME ID | AVAILABLE CAPACITY | USED CAPACITY | THRESHOLD VALUE | |
|---|---|---|---|---|
| V0001 | e1 | f1 | g1 | |
| V0002 | e2 | f2 | g2 | |
| ⋮ | ⋮ | ⋮ | ⋮ | |

| LEGAL ID | COMMENT DATA | REVISION HISTORY |
|---|---|---|
| L0001 | h1 | i1 |
| L0002 | h2 | i2 |
| ⋮ | ⋮ | ⋮ |

| COMMENT ID | COMMENT DATA | LEGAL ID |
|---|---|---|
| C0001 | g1 | L0001 |
| C0002 | g2 | L0002 |
| ⋮ | ⋮ | ⋮ |

F I G. 1 1

F I G. 1 2

F I G. 1 3

| SDN ID | CONTROLLER | ROUTER SWITCH | ROUTE INFORMATION |
|---|---|---|---|
| N0001 | k1 | I1-I10 | m1 |
| N0002 | k2 | I11-I20 | m2 |
| ⋮ | ⋮ | ⋮ | ⋮ |

DATA MIGRATION SYSTEM AND DATA MIGRATION METHOD

TECHNICAL FIELD

The present invention relates to a data migration system and a data migration method.

BACKGROUND ART

Up to now, various data are migrated between data centers. When data is migrated from one country to another country, there is a need to check whether information included in the data to be migrated meets a legal system of the country as a migration destination, or not. However, there is a need to check against the provisions stipulated by the legal system of the country to be migrated, which is not easy. In PTL1, it is determined whether a product and a manufacturing process of the product conform to the legal systems of a country of an export destination and a country of manufacturing the product, or not, by classifying the provisions into categories and rules of plural hierarchical levels, and the result showing the conformity to the legal system of the product and the manufacturing process.

CITATION LIST

Patent Literature

PTL1: Japanese Patent Application Laid-Open No. 2008-287303

SUMMARY OF INVENTION

Technical Problem

Recently, a network is actively established with the use of a technology called SDN (Software Defined Network) which controls devices configuring the network by software. In the SDN, since various settings for the respective devices configuring the network are performed by software, there is an advantage that the network is easily established or reestablished. For example, when circumstances such as insufficient server capacity of a data center in a certain area arise, and data stored in a server is migrated to a data center in another area, an SDN controller controls the software to reestablish the network between those data centers, thereby being capable of easily migrating data.

However, when the legal systems in the above areas are different from each other, as the migration of data is easier due to the SDN environment, a risk of migrating data that does not conform to the legal system of the migration destination becomes higher. In the above PTL1, although it can be determined whether the product and the product manufacturing process conform to the legal systems of the country of the export destination and the country of manufacturing the product, or not, a risk of migrating data in the SDN environment is not taken into consideration.

The present invention has been made in view of the above circumstances, and it is an object of the present invention to provide a data migration system capable of migrating data after checking whether the data conforms to a legal system of a migration destination in an SDN environment, or not, a data migration system capable of providing a data migration method, and the data migration method.

Solution to Problem

In order to solve the above problem, according to the present invention, there is provided a data migration system in which a first data center provided in a first area and a second data center provided in a second area are connected to each other by an SDP (Software Defined Network), in which the first data center includes: a first server that includes a first storage unit that stores data, a first request processing unit that transmits the data from the first data center to the second data center as a migration destination, and a migration determination unit that determines whether the data can be migrated, or not; and a control device that controls the SDN, the second data center includes: a second server that includes a second storage unit that stores data and a second request processing unit which stores the data received from the first data center as a migration source in the second storage unit; and a legal system management server that includes a legal data management unit which manages data on a legal system in the second area, the first request processing unit of the first server transmits a request for migration destination information to the second server of the second data center, and transmits the migration destination information received from the second server information, and identification information on the first server and identification information of the second server, which are identification information of the respective servers, to the control device that controls the SDN, the control device changes a communication setting between the first server and the second server based on the migration destination information and the migration source information received from the first server and SDN setting data on the communication setting of the SDN stored in the storage unit in advance, the migration determination unit of the first server receives the data on the legal system from the legal system server in the second area and determines whether the data conforms to the legal system, or not, to determine whether the data can be migrated, or not, the control device executes a change of the communication setting when receiving a determination result that the data can be migrated from the first server, when receiving a result of the changed communication setting from the control device, the migration determination unit of the first server transmits the data stored in the first storage unit to the second server according to the changed communication setting, and the second request processing unit of the second server stores the data stored in the first storage unit received from the first server in the second storage unit.

Further, the present invention also provides a data migration method performed in the data migration system.

Advantageous Effects of Invention

According to the present invention, in the SDN environment, data can be migrated after checking whether the data conforms to the legal system of the migration destination, or not.

DESCRIPTION OF EMBODIMENTS

Hereinafter, a data migration system and a data migration method according to an embodiment of the present invention will be described in detail with reference to the accompanying drawings.

Figure 1:
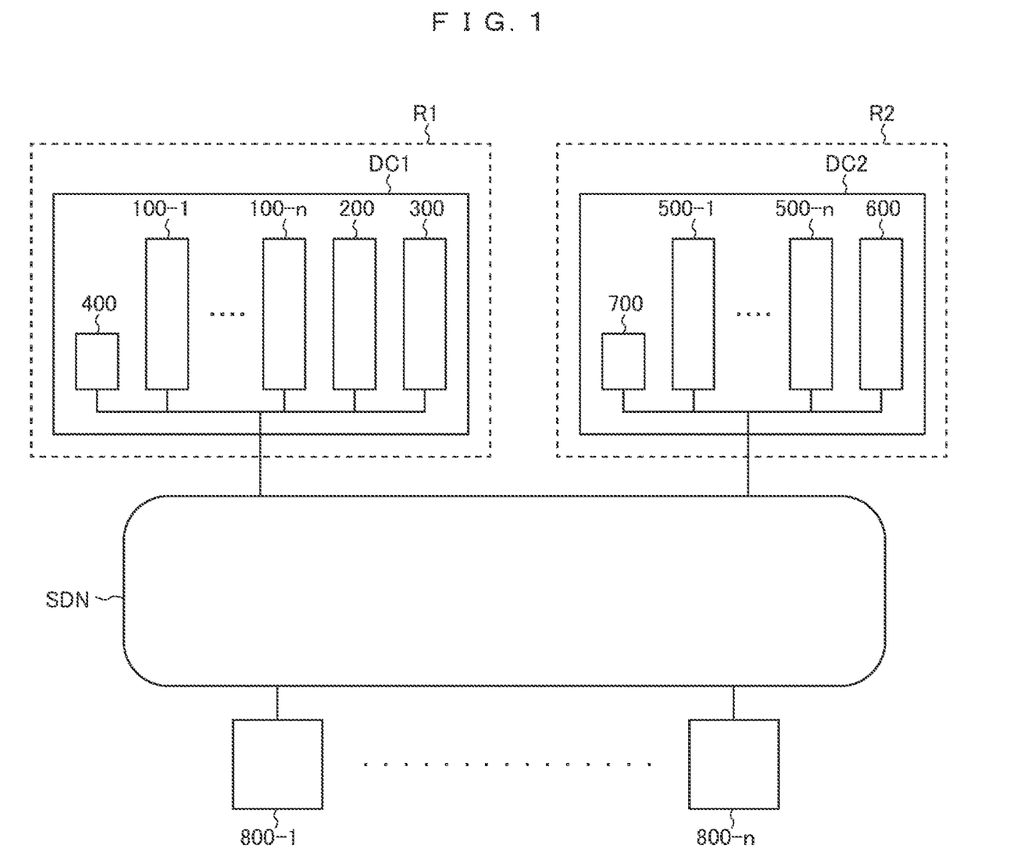
FIG. 1 is a diagram showing a functional configuration of a data migration system to which a data migration method and a data migration method according to the present invention are applied.

FIG. 1 is a diagram showing a functional configuration of a data migration system 1000 to which a data migration method and a data migration method according to the present invention are applied. The data migration system 1000 is a system in which data centers (DC) installed in multiple areas are connected to each other by an SDN. As shown in FIG. 1, the data migration system 1000 includes a DC provided for each area R (R1 and R2 in FIG. 1 and multiple client terminals 800 (800-1 to 800-n in FIG. 1) are connected to each other through the SDN. The SDN is a network that can dynamically set and change the configuration, functions, performance, and so on by software. The SDN separates a control plane (C plane) function related to network routing of the network and a control of a path and a data plane (D plane) function related to a control of delivery such as packet transfer from each other, to thereby realize rapid provision and advancement of network services.

Although not specifically shown in FIG. 1, actually, the SDP has a control device for controlling switches and a switch called an SDN controller, and the SDN can be configured by, for example, an OpenFlow (registered trademark) network and an OpenFlow switch. In the following example, the data migration system 1000 includes two data centers indicated by DC1 and DC2, each of which is connected to the multiple client terminals 800 through the SDN. The number of data centers can be arbitrarily determined according to a project scale or the like.

The DC is a data center installed in a certain area R1 (for example, country, area, municipality). As shown in FIG. 1, the DC includes servers 100 that execute processing in response to a processing request from the client terminals 800, a legal system management server 200 that manages the legal system in the area R1, a control device 300 that controls the SDN, and a manager terminal 400 that manages the respective servers in the DC. Since a configuration in the DC in the area R2 is similar to the DC in the area R1 except that no control device 300 is provided, the DC1 will be described as a representative. Hereinafter, a case where data is migrated from the DC in the area R1 to the DC in the area R2 as a migration destination will be described. However, the same can be applied to a case in which another DC connected to a network N not shown is set as the migration destination or a migration source. First, the servers 100 will be described. In the following description, it is assumed that the servers 100 and the legal system management server 200 are physically separate servers, but may be configured as virtualized servers.

Each server 100 is a server having a general configuration as hardware and is a server that executes processing in response to a processing request from the client terminal 800. In this example, a case in which the server 100 registers the product data in the storage unit 101 of the server 100 according to a processing request for registering a product from each client terminal 800 operated by a user who is a manager of a store registered in a shopping site will be described. However, the present invention is not limited to the above configuration but can be applied to various data.

Figure 2:
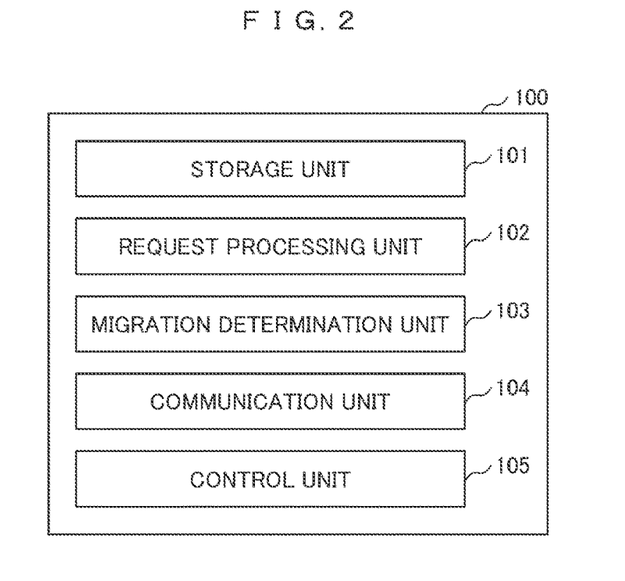
FIG. 2 is a diagram showing a functional configuration of a server.

FIG. 2 is a diagram showing a functional configuration of the server 100. As shown in FIG. 2, the server 100 includes a storage unit 101, a request processing unit 102, a migration determination unit 103, a communication unit 104, and a control unit 105. In this example, it is assumed that the DC is provided with n servers 100 including the servers 100-1 to 100-n. However, as with the case of DC, the number of servers 100 can be arbitrarily determined.

Figure 3:
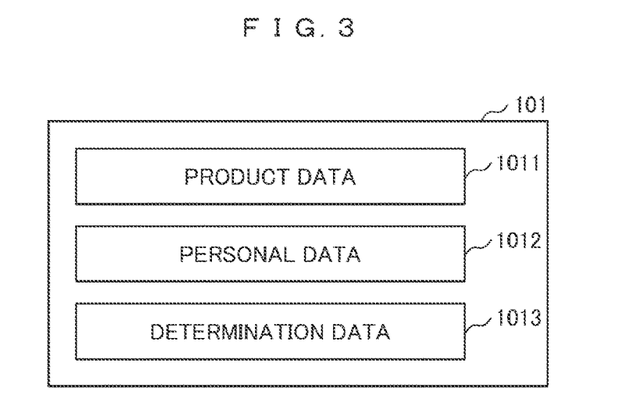
FIG. 3 is a diagram showing an example of data stored in a storage unit (server).

The storage unit 101 is configured by a storage device such as an HDD (hard disk drive) and stores data (for example, product data) requested for processing from any client terminal 800 or data (for example, personal data) registered by the user of the client terminal 800 for using the system. In this example, the server 100 is a server that operates a shopping site, and as shown in FIG. 3, the storage unit 101 stores product data 1011 on products handled at the site, personal data 1012 on an operator of the site, and determination data 1013 for determination of whether to migrate those pieces of data, or not.

Figure 4:
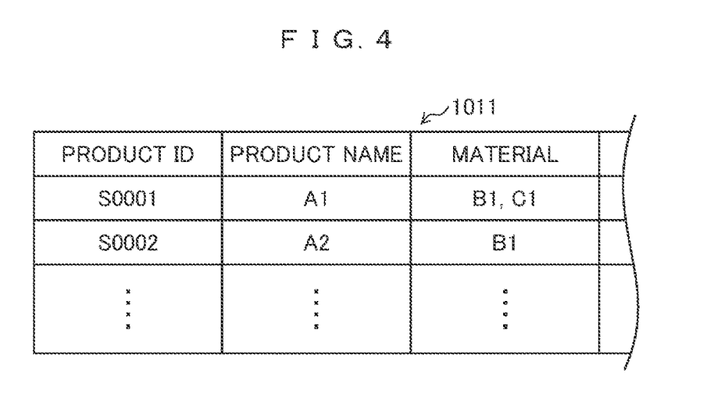
FIG. 4 is a diagram showing an example of product data.

FIG. 4 is a diagram showing an example of the product data 1011. As shown in FIG. 4, in the product data 1011, various data relating to each product including a product ID for identifying the product, a product name of the product, and a material of the product are stored in association with each other. In FIG. 4, for example, a product A1 having the product ID of S0001 is made of a material containing materials F1 and C1.

Figure 5:
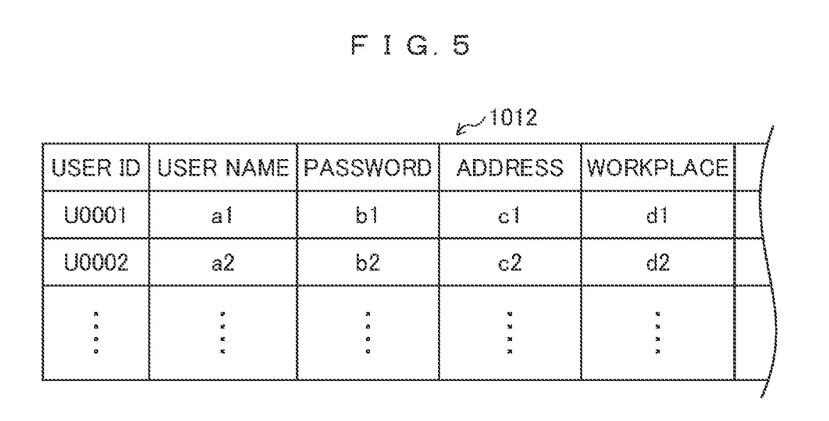
FIG. 5 is a diagram showing an example of personal data.

FIG. 5 is a diagram showing an example of the personal data 1012. As shown in FIG. 3, in the personal data 1012, various data relating to a user including personal information such as a user ID for identifying the user, a user name of the user, a password of the user, and an address and work place of the user are stored in association with each other. In FIG. 5, for example, a user a1 whose user number is U0001 uses the site with a password x1, resides in c1, and indicates that d1 is a work company.

Figure 6:
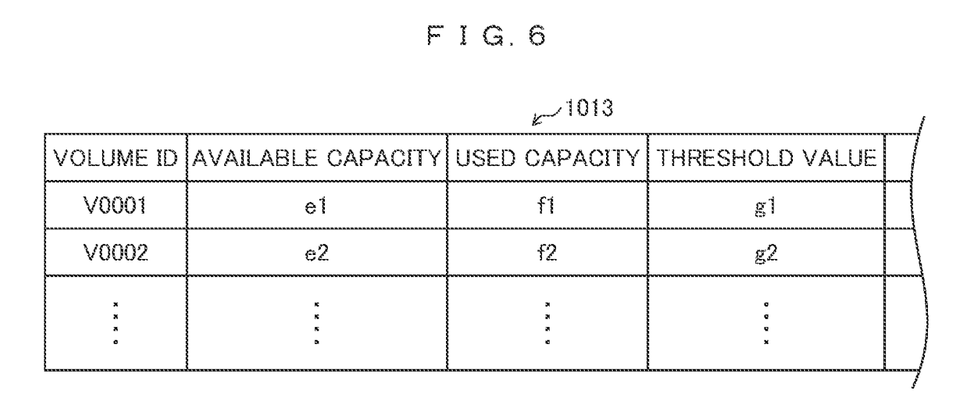
FIG. 6 is a diagram showing an example of determination data.

FIG. 6 is a diagram showing an example of the determination data 1013. As shown in FIG. 6, in the determination data 1013, a volume ID for identifying a volume of a disk configuring the storage unit 101, an available capacity of the volume, a current used capacity, and a threshold value serving as a criterion for determining that the capacity is tight are stored in association with each other. In FIG. 6, for example, it is understood that the available capacity of the disk whose volume 1D is v0001 is e1, and f1 is used at the present time. In addition, it is understood that the threshold value is 91. The used capacity is updated every time the request processing unit 102 registers data and is always in a latest state. Subsequently, returning to FIG. 1, the request processing unit 102 will be described.

The request processing unit 102 processes a request from the user who operates the shopping site and transmits a processing result to the user terminal 500. When the request processing unit 102 registers the data in the storage unit 101 according to the above request, the request processing unit 102 updates the used capacity of the determination data 1013.

The migration determination unit 103 determines whether to migrate the data stored in the storage unit 101, or not, determines a migration destination in the case of necessity of migration, and determine whether the migration is enabled, or not. The necessity of the migration is to determine whether to migrate the data stored in the storage unit 101 to another DC, or not. For example, when the storage capacity of the storage unit 101 of the server 100 is tight and new data cannot be registered, the migration determination unit 103 determines that the migration is necessary. In this example, whether the migration is necessary, or not, with respect to the capacity of the storage unit 101 of the server 100. Alternatively, it is determined whether there is an event that affects normal work in the environment of the server 100, such as the execution state of processing in the server 100, or not, whereby it may be determined whether the necessity of the data migration is necessary, or not, or it may be determined that the data is migrated according to an instruction from the manager. Further, in the determination of the migration destination, for example, when the migration determination unit 103 determines that the migration of data is necessary and a free capacity of the server of the migration destination DC is larger than the data to be migrated and has a sufficiently free space, the migration determination unit 103 determines the server of the DC as the migration destination. Further, whether the migration is enabled, or not, means, for example, whether the migration determination unit 103 determines whether the contents of the data to be migrated are data conforming to the legal system of the determined migration destination, or not, even if the migration is necessary, and the migration destination has been determined.

The communication unit 104 transmits and receives data with respect to the client terminals 800 and the servers 100.

The control unit 105 controls the operation of the respective units of the server 100. A specific process of the above respective units of the server 100 will be described later with reference to a sequence diagram.

Actually, in terms of hardware, the server 100 has a memory (not shown) for storing programs for realizing the functions of the respective units used in the present system, and is realized by causing the CPU to read those programs from the memory, load the programs on a main storage device not shown, and execute the programs.

The above programs may be recorded and provided in a computer readable recording medium such as CD-ROM (Compact Disc Read Only Memory) or DVD (Digital Versatile Disc) with a file of an installable format or an executable format, or may be stored in another computer connected to a network such as the Internet provided as a network and provided or distributed by being downloaded through the network. Subsequently, returning to FIG. 1, the legal system management server 200 will be described.

The legal system management server 200 is a server that manages matters related to laws, government ordinances, ordinances, and regulations defined in the area R1, and the legal system established in the area R1. Hereinafter, those matters are simply expressed as laws or the like.

Figure 7:
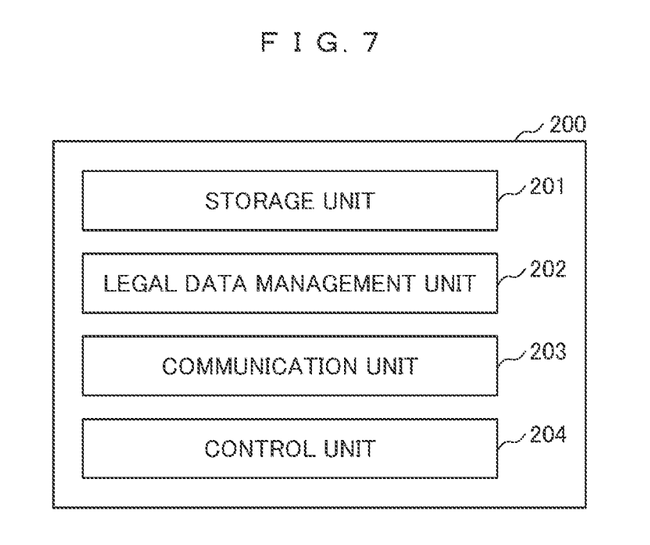
FIG. 7 is a diagram showing a functional configuration of a legal system management server.

FIG. 7 is a diagram showing a functional configuration of the legal system management server 200. As shown in FIG. 2, the legal system management server 200 includes a storage unit 201, a legal data management unit 202, a communication unit 203, and a control unit 204. The above legal data management unit 202 manages those pieces of data including the matters related to the government ordinance, the regulations, the rules, and the legal system defined in the area R1.

Figure 8:
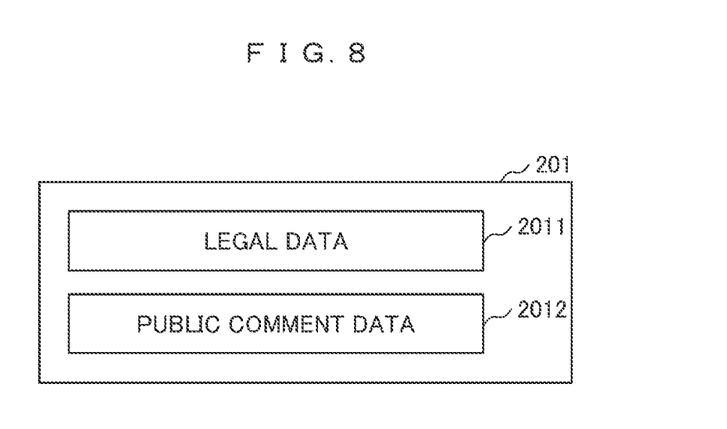
FIG. 8 is a diagram showing an example of data stored in a storage unit (legal system management server).

The storage unit 201 is configured by a storage device such as HDD, and as shown in FIG. 8, the storage unit. 101 stores legal data 2011 indicating laws and the like defined in the area R1, public comment data 2012 showing public comments on the above laws and so on.

Figure 9:
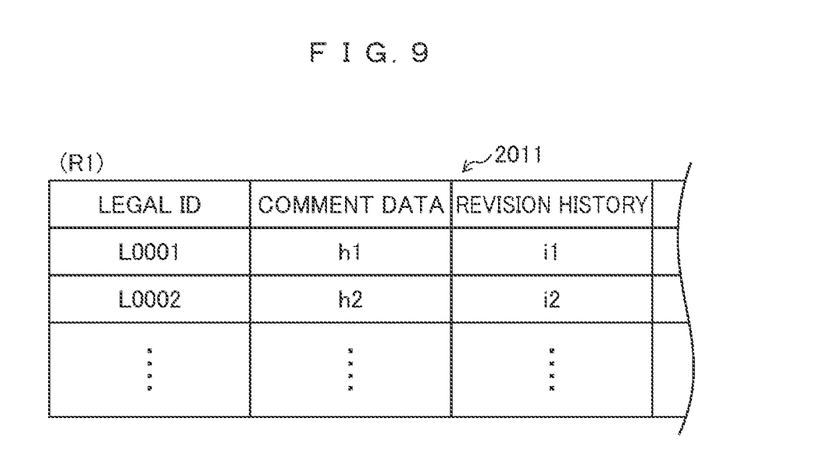
FIG. 9 is a diagram showing an example of legal data.

FIG. 9 is a diagram showing an example of the legal data 2011. As shown in FIG. 9, in the legal data 2011, a law ID for identifying a law and the like, provision data of that law, and a revision history of the provision are stored in association with each other in each area. In FIG. 9, for example, in the area R1, it is understood that the law whose law ID is LOOO1 is defined by provision data h1 and has been revised to i1 (for example, date).

Figure 10:
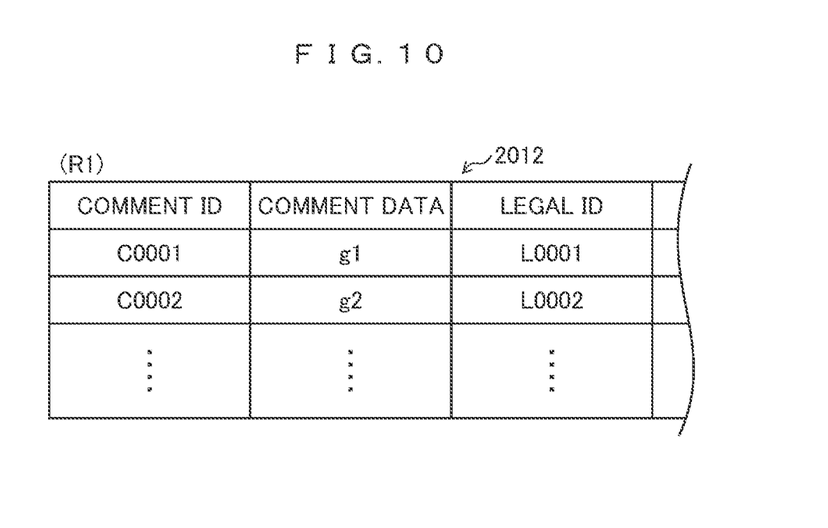
FIG. 10 is a diagram showing an example of public comment data.

FIG. 10 is a diagram showing an example of the public comment data 2012. As shown in FIG. 10, in the public comment data 2012, for each area, a comment ID for identifying a public comment, public comment data of the public commend, and a law ID indicating which law the public comment relates to are stored in association with each other. In FIG. 10, for example, it is understood that the content of the public comment whose comment ID is COOO1 is comment data j1 and relates to the law identified by LOOO1. Subsequently, returning to FIG. 1, the legal data management unit 202 will be described.

The legal data management unit 202 regularly accesses sites of institutions that determine laws and regulations of public offices and the like through the SDN or a network not shown to determine whether the above law and so on has been updated, or not, or whether the public comment has been published, or not. If it is determined that the law has been updated or the public comment has been published, the legal data management unit 202 acquires the latest legal data and public comment data and records the acquired data in the legal data 2011 and the public comment data 2012. As described above, the legal data management unit 202 maintains the legal data 2011 and the public comment data 2012 so as to be always in the latest state.

The communication unit 203 transmits and receives data with respect to the servers 100 and the site.

The control unit 204 controls the operation of the respective units of the legal system management server 200. A specific process of the respective units of the legal system management server 200 will be described later with reference to a sequence diagram.

Actually, as the hardware, the legal system management server 200 has a memory (not shown) for storing programs for realizing the functions of the respective units used in the present system, and is realized by causing the CPU to read those programs from the memory, load the read programs on a main storage device not shown, and execute the programs.

Incidentally, the above programs may be recorded and provided in a computer readable recording medium such as CD-ROM or DVD with a file of an installable format or an executable format, or may be stored in another computer connected to a network such as the Internet provided as a network and provided or distributed by being downloaded through the network. Subsequently, returning to FIG. 1, the control device 300 will be described.

The control device 300 is a device for managing an SUN controller and a router not shown provided in the SDN and a network connected to those components, and is, for example, a device that functions as an orchestrator.

Figure 11:
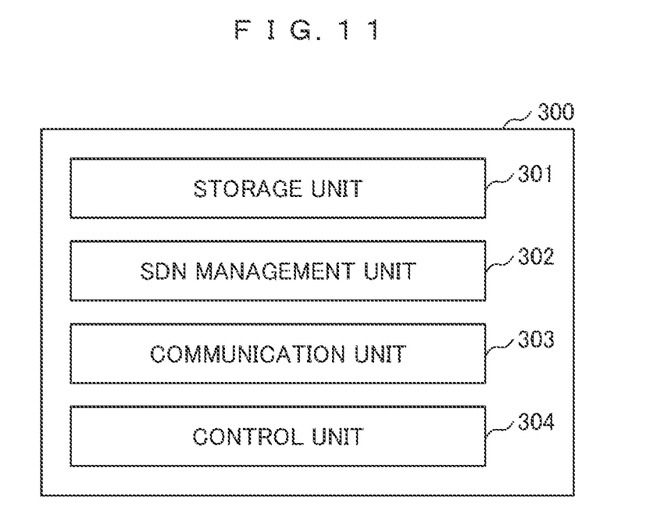
FIG. 11 is a diagram showing a functional configuration of a control device.

FIG. 11 is a diagram showing a functional configuration of the control device 300. As shown in FIG. 11, the control device 300 includes a storage unit. 301, an SDN management unit 302, a communication unit 303, and a control unit 304.

Figure 12:
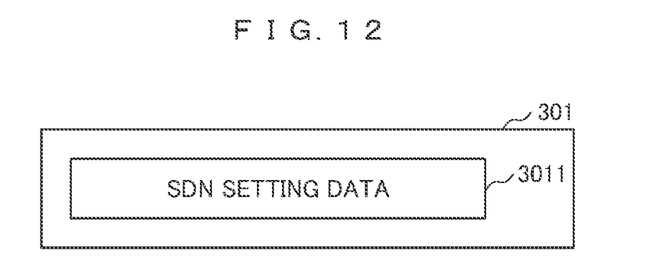
FIG. 12 is a diagram showing an example of data stored in a storage unit (control device).

The storage unit 301 is configured by a storage device such as an HDD, and stores SDN setting data 3011 indicating information on setting of the SDN (for example, information on communication settings such as the control plane and data plane) as shown in FIG. 12.

Figure 13:
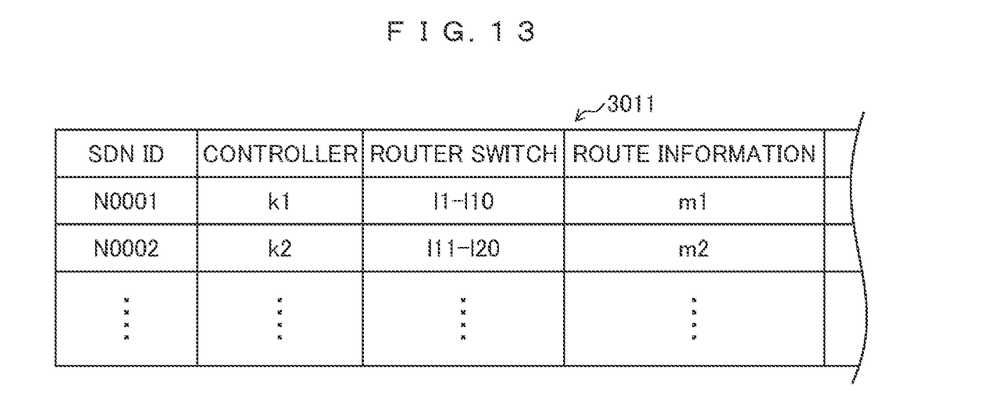
FIG. 13 is a diagram showing an example of SDN setting data.

FIG. 13 is a diagram showing an example of the SDN setting data 3011. As shown in FIG. 13, in the SDN setting data 3011, an SDNID for identifying a node in the SDN, an SDN controller for controlling a router and a switch included in the node, a router and a switch configuring the node, and route information indicating a communicable route through the router or switch in the node are stored in association with each other. In FIG. 13, for example, in the node whose SDNID is identified by NOOO1, an SDN controller k1 controls routers and switches 11 to 110 and indicates that a route indicated by m1 is communicable. Actually, the SDN controller actually sets various setting information for routers and switches in the SDN in those devices according to an instruction from the control device 300, though not shown in particular in this example.

The SDN management unit 302 sets or changes the route information for the SDN controller according to an instruction from the manager terminal 400. As described above, actually, the control device 300 transmits the instruction to the SDN controller, and the SDN controller performs those settings and changes.

The communication unit 303 transmits and receives data with respect to the servers 100 and the SDN controller.

The control unit 304 controls the operation of the respective units of the control device 300. A specific process of the above units of the control device 300 will be described later with reference to a sequence diagram.

Actually, as the hardware, the control device 300 has a memory (not shown) for storing programs for realizing the functions of the respective units used in the present system, and is realized by causing, the CPU to read those programs from the memory, load the programs on a main storage device not shown, and execute the programs.

Incidentally, the above programs may be recorded and provided in a computer readable recording medium such as CD-ROM or DVD with a file of an installable format or an executable format, or may be stored in another computer connected to a network such as the Internet provided as a network and provided or distributed by being downloaded through the network. Subsequently, returning to FIG. 1, the manager terminal 400 will be described.

The manager terminal 400 is a terminal operated by maintenance personnel who manages this system.

Figure 14:
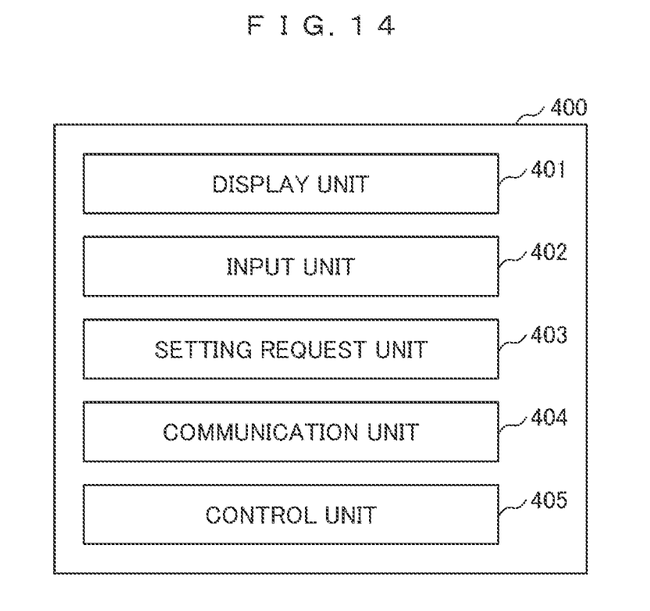
FIG. 14 is a diagram showing a functional configuration of a management terminal.

FIG. 14 is a diagram showing a functional configuration of the manager terminal 400. As shown in FIG. 14, the manager terminal 400 includes a display unit 401, an input unit 402, a setting request unit 403, a communication unit 404, and a control unit 405.

The display unit 401 is configured by, for example, a display, and displays various information including the change contents of the route information and the data migration result.

The input unit 402 is configured by, for example, keyboard, and receives input of various information including an instruction to change the route information from the maintenance personnel.

The setting request unit 403 transmits to the control device 300 a command including a request to change the setting according to the instruction accepted by the input unit 402.

The communication unit 404 transmits and receives data with respect to the servers 100 and the control device 300.

The control unit 405 controls the operation of the respective units of the manager terminal 400. A specific process of the respective units of the manager terminal 400 will be described later with reference to the sequence diagram.

Actually, as the hardware, the manager terminal 400 has a memory (not shown) for storing programs for realizing the functions of the above units used in the present system, and is realized by causing the CPU to read those programs from the memory, load those programs on a main storage device not shown, and execute the programs.

Incidentally, the above programs may be recorded and provided in a computer readable recording medium such as CD-ROM or DVD with a file of an installable format or an executable format, or may be stored in another computer connected to a network such as the Internet provided as a network and provided or distributed by being downloaded through the network. Subsequently, returning to FIG. 1, the client terminal 800 will be described. Since the server 500, the legal system management server 600, and the manager terminal 700 provided in the DC2 are the same as those in the DC1, a description of those components will be omitted.

The client terminal 800 is a terminal that accesses the servers 100 through the SDN. In this example, the client terminal 800 is operated by a user who is a manager of a shop registered in the shopping site.

Figure 15:
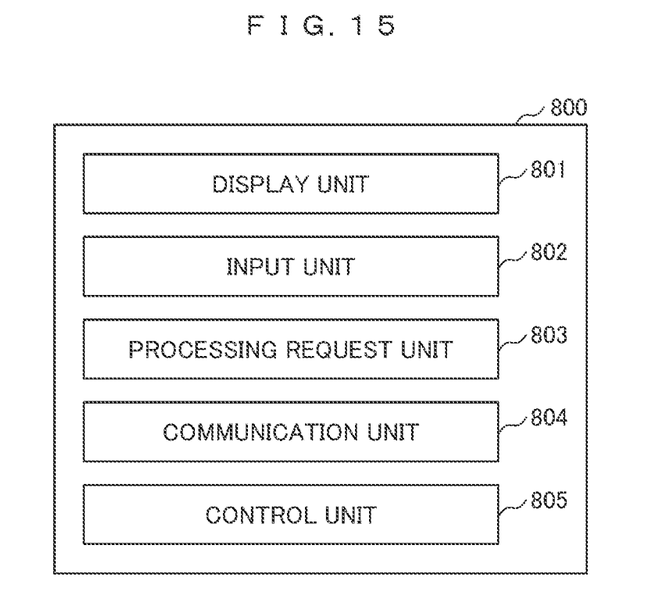
FIG. 15 is a diagram showing a functional configuration of a client terminal.

FIG. 15 is a diagram showing a functional configuration of the client terminal 800. As shown in FIG. 15, the client terminal 800 includes a display unit 801, an input unit 802, a processing request unit 803, a communication unit 804, and a control unit 805.

The display unit 801 is configured by, for example, a display, and displays various information including a processing request to the server 100 and the result of the processing request.

The input unit. 802 is configured by, for example, keyboard, and receives input of various information including the processing request from the user.

The processing request unit 803 transmits a command including the request received by the input unit 802 to the server 100.

The communication unit 804 transmits and receives data with respect to the server 100.

The control unit 805 controls the operation of the respective units of the client terminal 800. A specific process of the respective units of the client terminal 800 will be described later with reference to a sequence diagram.

Actually, as the hardware, the client terminal 800 has a memory (not shown) for storing programs for realizing the functions of the above respective units used in the present system, and is realized by causing the CPU to read those programs from the memory, load those programs on a main storage device not shown, and execute the programs.

Incidentally, the above programs may be recorded and provided in a computer readable recording medium such as CD-ROM or DVD with a file of an installable format or an executable format, or may be stored in another computer connected to a network such as the Internet provided as a network and provided or distributed by being downloaded through the network. Subsequently, a process to be performed in the present system will be described.

Figure 16:
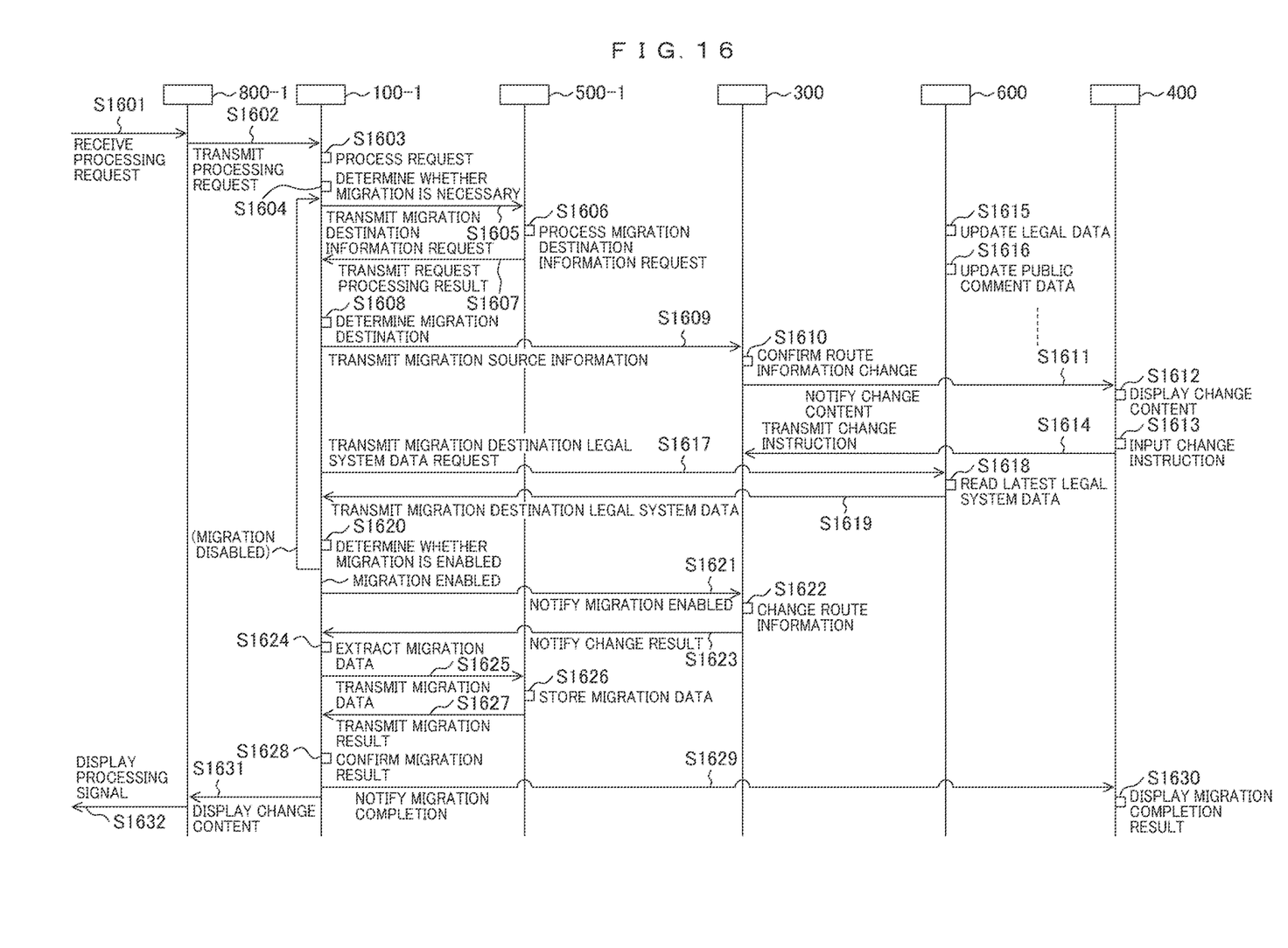
FIG. 16 is a sequence diagram showing a processing procedure of a data migration process.

FIG. 16 is a sequence diagram showing a processing procedure of a process (data migration process) to be performed in the present system. In FIG. 16, as an example, a case of migrating data from the area R1 to the area R2 will be described.

As shown in FIG. 16, the input unit 802 of the client terminal 800 first receives an input of a processing request from the user (Step S1601). In this case, it is assumed that the input unit 802, as a processing request, in order to register a new product whose product ID is S0003, product name is A3, material is D1 in the site, requests the server 100 to register explanation, image, and a moving picture of the product together with those pieces of information. The processing request unit 803 of the client terminal 800 transmits the command to the server 100 according to the input request (Step S1602).

Upon receiving the above command from the client terminal 800, the request processing unit 102 of the server 100 processes the request according to the command (Step S1603). In this example, the request processing unit 102 stores the new product in the product data 1011 of the storage unit 101.

The request processing unit 102 determines whether the data is to be migrated, or not, at the time of request processing (Step S1604). In this example, the request processing unit 102 refers to the determination data 1013 shown in FIG. 6 and determines whether there is free space to register the new product, or not. When the request processing unit 102 determines that there is no free space, the request processing unit 102 determines that the migration is necessary.

When the request processing unit 102 determines that the migration is necessary, the request processing unit 102 transmits a request for migration destination information including the free capacity of the current storage unit for each server to another DC (for example, DC2) (Step S1605). According to the request received from the server 100 of the DC1, the server 500 of the DC2 refers to the determination data stored in the storage unit and confirms the free space of the storage unit (Step S1606), and transmits the conformation result including the identification information and the address of the host device to the server 100 as migration destination information (Step S1607).

When the free space enough to register the product is indicated in the result received from the server 500, the migration determination unit 103 of the server 100 determines that server as the migration destination (Step S1608). The migration determination unit 103 transmits the migration destination information with the server as the migration destination and the migration source information including the identification information and the address of the host device to the control device 300 (Step S1609).

The SDN management unit 302 of the control device 300 refers to the migration destination information and the migration source information received from the server 100 and the SDN setting data 3011 stored in the storage unit 301 and determines whether the route from the server as the migration source to the server as the migration destination is included in the routes in the SDN setting data 3011, or not (Step S1610). If it is determined that the route is not included in the routes in the SDN setting data 3011, the SDN management unit 302 instructs the SDN controller to change the route so as to be included in the routes in the SDN setting data 3011, and transmits confirmation information for confirming a change in the route for the manager to the manager terminal 400 (Step S1611).

The setting request unit 403 of the manager terminal 400 displays the confirmation information received from the control device 300 on the display unit 401 (Step S1612), and the input unit 402 receives an instruction for the confirmation information from the manager (Step S1613). In this example, it is assumed that the manager instructs permission of the change to the change information. The setting request unit 403 transmits the received instruction to the control device 300 (Step S1614).

The legal system management server 600 of the DC2 regularly accesses the site of an agency that defines laws and the like of government agencies and the like to determine whether the above laws and the like have been updated or whether the public comment has been published. If it is determined that the laws or the public comment has been updated or published, the law system management server 600 acquires the latest legal data and the public comment data and records the acquired data in the legal data 2011 and the public comment data. 2012 (Steps S1615, S1616).

Upon completion of the processing in S1609, the migration determination unit 103 of the server 100 transmits a request for legal system data on the latest laws and the like at the present time to the legal system management server 600 in the area R2 to be migrated (Step S1617). The legal data management unit 602 of the legal system management server 600 reads the legal data and the public comment data in the storage unit according to the request received from the server 100, and transmits the legal data and public comment data to the server 100 (Steps S1618, S1619).

The migration determination unit 103 of the server 100 determines whether the data whose migration destination is determined in Step S1608 can be migrated, or not (Step S1620). In this example, the migration determination unit 103 compares the data on the product ID of S0003, which is data on the migration source, with the legal system data received in Step S1619, and determines whether the data on the product can be sold in the area R2 which is the migration destination, or not. The migration determination unit 103 determines whether there is a provision of articles or the like in which sale is stipulated in the legal system data, or not, with wording described as the material of the product, the product name, or explanation of the product as a key. For example, if it is stipulated that the product is contrary to public order and morals, since the product cannot be sold, data cannot be migrated.

If it is determined that the data cannot be migrated, the migration determination unit 103 returns to Step S1605 and repeats the migration processing. That is, the migration determination unit 103 executes the above processing on another server provided in the DC2 connected to the DC1 or another server provided in another DC, and repeats the processing until it is determined that the data can be migrated.

On the other hand, if it is determined that the data can be migrated, the migration determination unit 103 transmits the determination result to the control device 300 (Step S1621). Upon receiving the above notification from the server 100, the SDN management unit 302 of the control device 300 executes a change in the route according to the change information confirmed in Step S1610 (Step S1622), and notifies the server 10 of the result (Step S1623).

Upon receiving the notification from the control device 300, the migration determination unit 103 of the server 100 extracts data to be migrated to the migration destination from the storage unit 101, and transmits the extracted data to the migration destination through the route changed by the control device 300 in Step S1622 (Steps S1624 and S1625). The request processing unit 602 of the server 500 as the migration destination stores the data received from the server 100 in the storage unit 101 (Step S1626), and transmits the result to the server 100 (Step S1627).

The migration determination unit 103 of the server 100 determines whether the result received from the server 500 is a result indicating that the migration has been completed, or not, and if it is determined that the result indicates that the migration has been completed, the migration determination unit 103 transmits this fact to the manager terminal 400 (Step S1629). The setting request unit 403 of the manager terminal 400 displays the result received from the server 100 on the display unit 401 (Step S1630). Upon checking the result displayed on the display unit 401, the manager can grasp that the data migration has been completed, and from what area DC to which area DC the data has been migrated.

Upon completion of the processing in Step S1628, the migration determination unit 103 of the server 100 notifies the client terminal 800 that received the processing request in Step S1602 of the processing result (Step S1631), and the processing rest unit 803 of the client terminal 800 displays the above processing result on the display unit 801 (Step S1632). Upon confirming the processing result, the user can grasp that the processing requested by the user has been completed. The above process result includes such a message that, for example, a new product whose product ID is S0003, product name is A3, and material is D1 has been uploaded to the site, or a new product could not been uploaded since there is no free data capacity. If the user receives a message such that the new product could not been uploaded, for example, the user may execute the process from Step S1601 after reducing the image or moving image data on the new product.

In the above description, the product data has been exemplified, but the same is applicable to a case in which personal data is migrated. For example, an identification number for identifying a citizen in the area is not registered as personal information in the personal data in the area R1 as the migration source. However, in the area R2 to be migrated, in the case where the personal data is held as personal information, when an article or the like stipulates that the identification number for identifying the above citizen must be included, terminal 800 is notified of a message indicating that the personal data cannot be migrated to the migration destination as a result of processing.

As described above, in this system, since the data is migrated after executing the above processing and determining whether to migrate the data, the migration destination, and whether the migration is enabled, the data can be migrated after checking whether the data conforms to the legal system of the migration destination in the SDN environment, or not. In this example, a case in which the data is registered on the server has been described. Alternatively, for example, the present system can also be applied to a case where backup data at the time of failure is migrated from one area to another area and stored. Also, in the present example, it is assumed that the areas R1 and R2 are countries, butt the same can be applied to the case of regions and local governments. In that case, the provisions of government ordinances and regulations and the like prescribed for each region and local government may be used instead of the legal data.

REFERENCE SIGNS LIST

1000, data migration system
100, 500, server
101, storage unit
1011, product data
1012, personal data
1013, determination data
102, request processing unit
103, migration determination unit
104, communication unit
105, control unit
200, 600, legal system management server
201, storage unit
2011, legal data
2012, public comment data
202, legal data management unit
203, communication unit
204, control unit
300, control device
301, storage unit
3011, SDN setting data
302, SDN management unit
303, communication unit
304, control unit
400, 700, manager terminal
401, display unit
402, input unit
403, setting request unit
404, communication unit
405, control unit 405
800, client terminal
801, display unit
802, input unit
803, processing request unit
804, communication unit
805, control unit
DC1, DC2, data center
SDN, Software Defined Network

The invention claimed is:

1. A data migration system, comprising:
a first data center provided in a first area, which is connected to a second data center provided in a second area over an SDN (Software Defined Network),
wherein the first data center includes:
a first server that includes a first storage unit that stores data, a request processing unit that transmits the data from the first data center to the second data center as a migration destination, and a migration determination unit that determines whether the data is to be migrated based on an execution state of the first server; and
a control device that controls the SDN,
wherein upon determining the data is to be migrated based on the execution state of the first server and after the migration determination unit determines the data is to be migrated based on the execution state of the first server, the request processing unit transmits a request for migration destination information to the second data center, and transmits: (1) the migration destination information received from the second data center, (2) identification information on the first server, and (3) identification information on the second server, which are identification information on the respective servers, to the control device,
wherein the control device changes a communication setting between the first server and the second server based on the migration destination information and identification information on the first server received from the first server and SDN setting data on the communication setting of the SDN previously stored in a storage unit of the control device, wherein the migration determination unit receives legal system data in the second area from the second data center, the legal system data including legal data indicating laws of one or more jurisdictions and public comment data indicating one or more public comments about the laws included in the legal data, and determines whether the data conforms to the legal system based on comparing the data to be migrated to the received legal system data to determine whether the data migration is enabled, wherein the control device executes a change in the communication setting when receiving a determination result that the migration is enabled based on the comparison of the data to be migrated and the received legal system data from the first server, and wherein when receiving a result of the changed communication setting from the control device, the migration determination unit transmits the data stored in the first storage unit to the second server according to the changed communication setting.

2. The data migration system according to claim 1, wherein the migration determination unit determines whether the data conforms to the legal system, or not, based on the legal system data updated to the latest state, which has been received from the second data center.

3. The data migration system according to claim 1, wherein the migration determination unit repeats data migration determination until determining that migration of the data is permitted when determining that the migration of the data is not permitted, and transmits the request for the migration destination information to another second server provided in the second data center or another server provided in another data center other than the second data center.

4. The data migration system according to claim 1, wherein when the SDN setting data is changed, the control device notifies a display unit of a manager terminal connected to the first server of a fact, and when the data has been migrated, the control device notifies the manager terminal of the fact.

5. A data migration method performed in a data migration system including: a first server having a request processing unit that transmits data stored in a first data center provided in a first area as a migration source to a second data center provided in a second area as a migration destination, which are connected to each other over an SDN and a migration determination unit; and a control device that controls the SDN, the method comprising:

determining, by the migration determination unit, whether the data is to be migrated based on an execution state of the first server;

upon determining the data is to be migrated based on the execution state of the first server, and after the migration determination unit determines the data is to be migrated based on the execution state of the first server, transmitting, by the request processing unit, a request for migration destination information to the second data center, and transmits: (1) the migration destination information received from the second server center, (2) identification information on the first server and (3) identification information on the second server provided in the second data center, which are identification information on the respective servers, to the control device;

changing, by the control device, a communication setting between the first server and the second server based on the migration destination information and the identification information on the first server received from the first server and SDN setting data on the communication setting of the SDN previously stored in a storage unit of the control device;

receiving, by the migration determination unit, legal system data in the second area from the second data center, the legal system data including legal data indicating laws of one or more jurisdictions and public comment data indicating one or more public comments about the laws included in the legal data, and determines whether the data conforms to the legal system based on comparing the data to be migrated to the received legal system data to determine whether migration of the data is enabled;

executing, by the control device, a change of the communication setting when receiving a determination result that the data can be migrated from the first server; and when receiving a result of the changed communication setting from the control device, transmitting, by the migration determination unit, the data stored in the first storage unit to the second server according to the changed communication setting.

6. The data migration method according to claim 5, wherein the migration determination unit determines whether the data conforms to the legal system, or not, based on the legal system data updated to the latest state, which has been received from the second data center.

7. The data migration method according to claim 5, wherein the migration determination unit repeats data migration determination until determining that migration of the data is permitted when determining that the migration of the data is not permitted, and transmits the request for the migration destination information to another second server provided in the second data center or another server provided in another data center other than the second data center.

8. The data migration method according to 5, wherein when the SDN setting data is changed, the control device notifies a display unit of a manager terminal connected to the first server of a fact, and when the data has been migrated, the control device notifies the manager terminal of the fact.

* * * * *